United States Patent
Li et al.

(10) Patent No.: US 9,256,012 B2
(45) Date of Patent: Feb. 9, 2016

(54) COLOR FILTER SUBSTRATE, MANUFACTURING METHOD THEREOF AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Min Li, Beijing (CN); Jingjing Jiang, Beijing (CN); Tonghua Yang, Beijing (CN); Changgang Huang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 36 days.

(21) Appl. No.: 14/350,914

(22) PCT Filed: Dec. 12, 2013

(86) PCT No.: PCT/CN2013/089221
§ 371 (c)(1),
(2) Date: Apr. 10, 2014

(87) PCT Pub. No.: WO2014/183430
PCT Pub. Date: Nov. 20, 2014

(65) Prior Publication Data
US 2015/0309221 A1    Oct. 29, 2015

(30) Foreign Application Priority Data

May 15, 2013   (CN) .......................... 2013 1 0179906

(51) Int. Cl.
*G02F 1/1335*   (2006.01)
*G02B 5/20*   (2006.01)

(52) U.S. Cl.
CPC ...................................... *G02B 5/201* (2013.01)

(58) Field of Classification Search
CPC .................................................. G02F 1/13394
See application file for complete search history.

(56) References Cited

U.S. PATENT DOCUMENTS

| | | | | |
|---|---|---|---|---|
| 5,978,061 A | * | 11/1999 | Miyazaki et al. | 349/155 |
| 6,147,729 A | * | 11/2000 | Kurauchi et al. | 349/106 |
| 2002/0171800 A1 | * | 11/2002 | Miyazaki et al. | 349/156 |

(Continued)

FOREIGN PATENT DOCUMENTS

| | | |
|---|---|---|
| CN | 103268037 A | 8/2013 |
| JP | 2012-159757 A | 8/2012 |

OTHER PUBLICATIONS

International Search Report mailed Mar. 20, 2014; PCT/CN2013/089221.
Written Opinion of the International Searching Authority dated Mar. 7, 2014; PCT/CN2013/089221.

*Primary Examiner* — Timothy L Rude
(74) *Attorney, Agent, or Firm* — Ladas & Parry LLP

(57) ABSTRACT

A color filter substrate, a manufacturing method thereof and a display device are provided. The color filter substrate includes a substrate; a black matrix dividing the substrate into a plurality of sub-pixel areas arranged in matrix; a color filter layer including color photoresist patterns with N different colors, N≥3, arranged cyclically in discontinuous sub-pixel areas in adjacent N rows/columns, the color photoresist patterns in M adjacent sub-pixel areas of a single color in at least one line/column in the color filter layer extending to regions over the black matrix corresponding to regions between adjacent sub-pixel areas, to form continuous strip-like color photoresist patterns, wherein M≥2; and spacers including main spacers disposed over regions between adjacent discontinuous color photoresist patterns corresponding to the black matrix and secondary spacers disposed over regions of the continuous strip-like color photoresist patterns corresponding to the black matrix.

20 Claims, 6 Drawing Sheets

(56) References Cited

U.S. PATENT DOCUMENTS

2010/0045906 A1* 2/2010 Tokuda et al. ............... 349/110
2010/0165266 A1* 7/2010 Sakata et al. ............... 349/106
2010/0302496 A1* 12/2010 Zhao ............................ 349/155
2012/0188494 A1* 7/2012 Yoshida et al. ............. 349/106

* cited by examiner

COLOR FILTER SUBSTRATE, MANUFACTURING METHOD THEREOF AND DISPLAY DEVICE

BACKGROUND

Embodiments of the present invention relate to a color filter substrate, a manufacturing method thereof and a display device.

SUMMARY

Liquid crystal display devices (LCDs) have become main stream products in the current panel displays due to their small volume, low power consumption and absence of radiation. With the development of display technology, display devices with high transmittance, large size, low power consumption and low costs have become the future development trend.

A conventional liquid crystal panel includes a color filter substrate and an array substrate with liquid crystal disposed between them. In order to maintain the cell gap, and prevent the liquid crystal from failing to display normally due to deformation under compression, spacers are typically disposed between the color filter substrate and the array substrate. As shown in FIGS. 1 and 2, in conventional technique, a color filter substrate includes: a substrate 1, a black matrix 3 (BM), a color filter layer 4, a protective layer 5 (OC) and spacers 6 disposed over the protective layer 5.

In a conventional color filter substrate, the black matrix 3 is disposed on the substrate 1 to divide the substrate 1 into a plurality of sub-pixel areas distributed in a matrix, the color filter layer 4 includes color photoresist patterns with different colors disposed cyclically in discontinuous sub-pixel areas in adjacent N rows/columns, that is, the color filter layer 4 includes a plurality of color photoresist patterns adapted to the shape and size of the individual sub-pixel areas and covering the respective sub-pixel area, and the color photoresist patterns with a single color are discontinuously disposed in a plurality of sub-pixel areas. Spacers are generally disposed over the protective layer 5 opposite to the black matrix 3. In order to improve display quality, a spacer 6 is generally designed as a structure including a main spacer 61 (Main PS) for primary support and a secondary spacer 62 (Sub PS) for secondary support. The main spacer 61 has a height greater than that of the secondary spacer 62, and the height difference between them can be used to adjust the deformation of the liquid crystal display generated due to pressure.

In order to manufacture main spacer 61 and secondary spacer 62 with different heights, two methods are typically used. One method is realizing the height difference of the main spacer 61 and the secondary spacer 62 by controlling the light intensity of the exposure during forming the main spacer 61 and the secondary spacer 62 with a halftone mask or a gray-tone mask over the protective layer 5 to be formed with spacers and after the development. With this method, the size of the spacers is not limited, however, cost of halftone mask or gray-tone mask is high, resulting in high cost for manufacturing the color filter substrate. Another method is realizing the height difference between the main spacer 61 and the secondary spacer 62 by designing the exposure zone in the mask for forming the main spacer 61 and the secondary spacer 62 with different sizes using a common mask over the protective layer 5 to be formed with spacers, so as to influence the light intensity transmitting through the exposure zone during the exposing. With this method, since the size of exposure zone in the mask for forming secondary spacer 62 is small, to obtain the size of secondary spacer 62 with suitable height, the size of this exposure zone should be controlled strictly. However, depending on the conventional photolithographic process level and photoresist properties, only when the cross-sectional dimension of the top of the formed spacer is small, its height would vary with dimension variation of the exposure zone of the mask. For example, only when the cross-sectional dimension of the top of the secondary spacer 62 is small (9-11 μm), it is possible to realize the height difference design of the main spacer 61 and the secondary spacer 62, while it is difficult to ensure its homogeneity. The maximum height difference that can be realized is less than or equal to 0.5 μm, which imposes significant limitation on the applications of the color filter substrate.

SUMMARY

Embodiments of the present invention provide a color filter substrate, a manufacturing method thereof and a display device, which can realize height difference control of the main spacer and the secondary spacer with a common mask and have low costs.

According to one aspect of the present invention, a color filter substrate is provided, comprising: a substrate; a black matrix dividing the substrate into a plurality of sub-pixel areas arranged in matrix; a color filter layer including color photoresist patterns with N different colors, N≥3, arranged cyclically in discontinuous sub-pixel areas in adjacent N rows/columns, the color photoresist patterns in M adjacent sub-pixel areas of a single color in at least one line/column in the color filter layer extending to regions over the black matrix corresponding to regions between adjacent sub-pixel areas, to form continuous strip-like color photoresist patterns, wherein M≥2; and spacers including main spacers disposed over regions between adjacent discontinuous color photoresist patterns corresponding to the black matrix and secondary spacers disposed over regions of the continuous strip-like color photoresist patterns corresponding to the black matrix.

In an example, the N=3, the color photoresist patterns of different colors comprise red photoresist patterns, green photoresist patterns and blue photoresist patterns cyclically arranged in rows/columns; or the N=4, the color photoresist patterns of different colors include red photoresist patterns, green photoresist patterns, blue photoresist patterns and yellow photoresist patterns cyclically arranged in rows/columns.

In an example, the secondary spacers is formed by a material, which is identical to that is used for forming color photoresist patterns after forming the continuous strip-like color photoresist patterns.

In an example, the color filter substrate further comprises a protective layer disposed over the black matrix, the secondary spacers and the color filter layer, and the main spacers are disposed over the protective layer.

In accordance with another aspect of the present invention, a display device is provided, including the described color filter substrate.

In accordance with yet another aspect of the present invention, a method of manufacturing a color filter substrate is provided, comprising: forming a black matrix over a substrate, which divides the substrate into a plurality of sub-pixel areas arranged in matrix; forming a color filter layer over the substrate, including cyclically disposing color photoresist patterns of N different colors in discontinuous sub-pixel areas in adjacent N rows/columns, N≥3, and forming continuous strip-like color photoresist patterns extending to regions over the black matrix; and forming spacers including main spacers and secondary spacers over the substrate, the main spacers formed over regions between adjacent discontinuous color photoresist patterns corresponding to the black matrix, and the secondary spacers formed over regions of the continuous strip-like color photoresist patterns corresponding to the black matrix, the secondary spacers being formed in a same photolithographic process with the color photoresist patterns of a $N^{th}$ color.

In an example, step of forming the secondary spacers in a same photolithographic process with the color photoresist patterns of a $N^{th}$ color comprises: Step S1: forming a layer of color resin material for forming color photoresist patterns of the $N^{th}$ color over the substrate with color photoresist patterns of N−1 colors already formed; Step S2: exposing the substrate having gone through step S1 with a mask provided with patterns corresponding to that for forming secondary spacers and color photoresist patterns of the $N^{th}$ color; and Step S3: developing the substrate having gone through step S2, and forming the secondary spacers and the color photoresist patterns of the $N^{th}$ color at the same time.

In an example, in the step S1, step of forming color photoresist patterns of N−1 colors comprises: forming color photoresist patterns of a first to a $N-1^{th}$ colors by N−1 photolithographic processes respectively in the arrangement direction of the color photoresist patterns, the color photoresist patterns in M neighbor sub-pixel areas of at least one row/column of a single color in the color filter layer extending to regions over the black matrix between corresponding adjacent sub-pixel areas, to form continuous strip-like color photoresist patterns, wherein M≥2.

In an example, the color photoresist patterns of the $N^{th}$ color is made of a color resin material containing a light sensitive composition, and in step S2, regions in the mask corresponding to formation of secondary spacers are designed as regions keeping resin material.

In an example, the method further comprising a step of forming a protective layer formed over the black matrix, the secondary spacers and the color filter layer, wherein the main spacers is formed over the protective layer.

In an example, the N=3, the color photoresist patterns of different colors comprise red photoresist patterns, green photoresist patterns and blue photoresist patterns cyclically arranged in rows/columns; or, the N=4, the color photoresist patterns of different colors include red photoresist patterns, green photoresist patterns, blue photoresist patterns and yellow photoresist patterns cyclically arranged in rows/columns.

BRIEF DESCRIPTION OF THE DRAWINGS

Embodiments of the present invention will be described in more detail below with reference to the accompanying drawings to enable those skilled in the art to understand the present invention more clearly, wherein.

Figure 1:
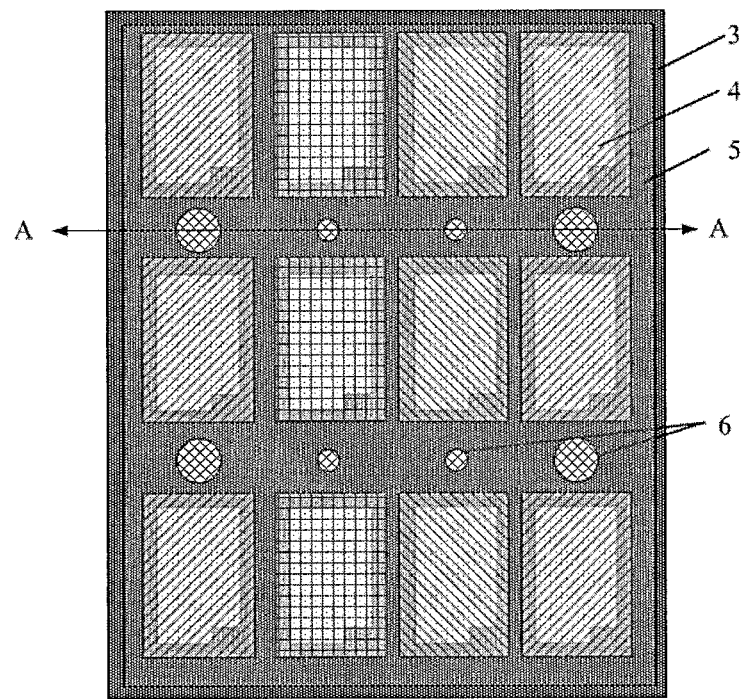
FIG. 1 is a schematic plan view of a conventional color filter substrate.
Figure 2:
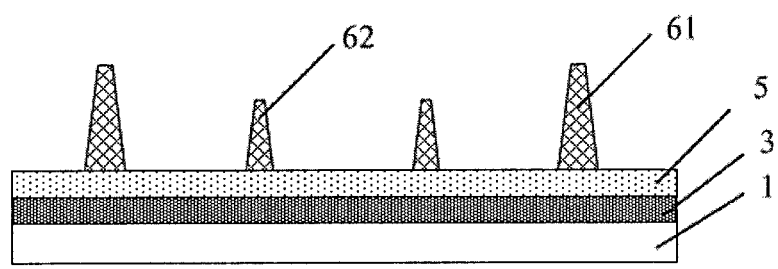
FIG. 2 is a sectional view along line A-A of the color filter substrate in FIG. 1.

In the figures: 1—substrate; 3—black matrix; 4—color filter layer; 5—protective layer; 6—spacer; 61—main spacer; 62—secondary spacer; 72—secondary spacer region; 73—color photoresist pattern region.

DETAILED DESCRIPTION OF THE PREFERRED EMBODIMENTS

To make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The teens, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

A color filter substrate comprising: a substrate; a black matrix dividing the substrate into a plurality of sub-pixel areas arranged in matrix; a color filter layer including color photoresist patterns with N different colors, N≥3, arranged cyclically in discontinuous sub-pixel areas in adjacent N rows/columns, the color photoresist patterns in M adjacent sub-pixel areas of a single color in at least one line/column in the color filter layer extending to regions over the black matrix corresponding to regions between adjacent sub-pixel areas, to form continuous strip-like color photoresist patterns, wherein M≥2; and spacers including main spacers disposed over regions between adjacent discontinuous color photoresist patterns corresponding to the black matrix and secondary spacers disposed over regions of the continuous strip-like color photoresist patterns corresponding to the black matrix.

A display device comprising the described color filter substrate.

A method of manufacturing a color filter substrate, comprising: forming a black matrix over a substrate, which divides the substrate into a plurality of sub-pixel areas arranged in matrix; forming a color filter layer over the substrate, including cyclically disposing color photoresist patterns of N different colors in discontinuous sub-pixel areas in adjacent N rows/columns, N≥3, and forming continuous strip-like color photoresist patterns extending to regions over the black matrix; and forming spacers including main spacers and secondary spacers over the substrate, the main spacers formed over regions between adjacent discontinuous color photoresist patterns corresponding to the black matrix, and the secondary spacers formed over regions of the continuous strip-like color photoresist patterns corresponding to the black matrix, the secondary spacers being formed in a same photolithographic process with the color photoresist patterns of a $N^{th}$ color.

Embodiment 1

Figure 3:
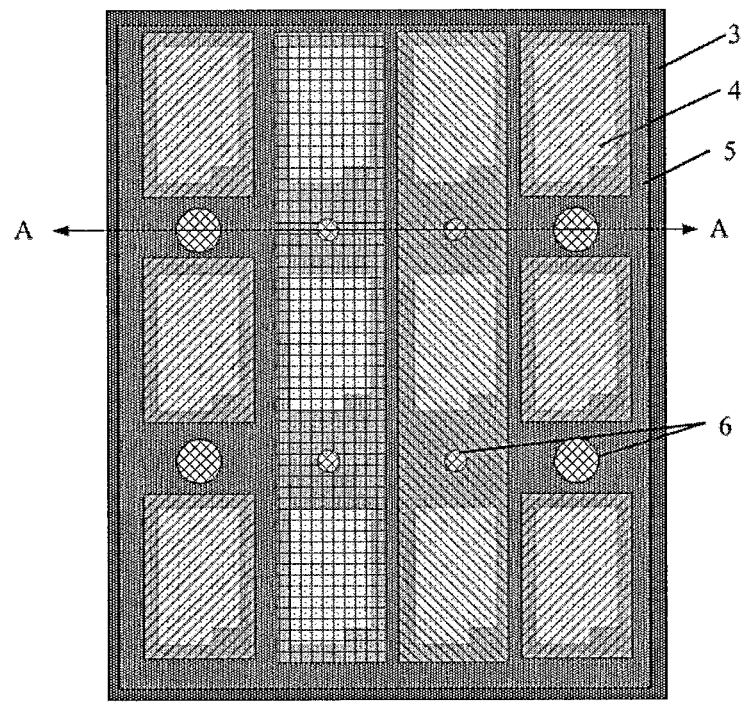
FIG. 3 is a schematic plan view of the color filter substrate in Embodiment 1 of the present invention.
Figure 4:
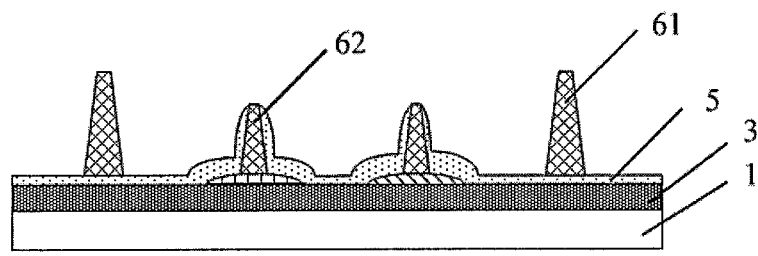
FIG. 4 is a sectional view along line A-A of the color filter substrate in FIG. 3.

FIGS. 3 and 4 show a color filter substrate including a substrate 1, a black matrix 3, a color filter layer 4 and spacers 6. The black matrix 3 divides the substrate 1 into a plurality of sub-pixel areas arranged in matrix. The color filter layer 4 includes color photoresist patterns with N different colors (N≥3) disposed cyclically in discontinuous sub-pixel areas in adjacent N rows/columns. The color photoresist patterns in M adjacent sub-pixel areas of a single color in at least one row/column in the color filter layer 4 further extend to regions over the black matrix 3 corresponding to regions between adjacent sub-pixel areas, to form continuous strip-like color photoresist patterns, wherein M≥2. The spacers 6 include a main spacers 61 disposed over regions between adjacent discontinuous color photoresist patterns corresponding to the black matrix 3 and secondary spacers 62 disposed over regions of the continuous strip-like color photoresist patterns corresponding to the black matrix 3.

The substrate 1 is a transparent substrate functioning as a base for manufacturing the color filter substrate and may be of glass, quartz, transparent resin, which will not be limited hereto.

In this embodiment, the N=3. M=the number of sub-pixel areas in one row/column. That is, when forming the continuous strip-like color photoresist patterns, color photoresist patterns of corresponding color extend to regions over the black matrix between all sub-pixel areas in the corresponding row/column. The color photoresist patterns of different colors include red photoresist patterns (R), green photoresist patterns (G) and blue photoresist patterns (B) cyclically arranged in rows/columns. As shown in FIGS. 3 and 4, the two columns of red photoresist patterns and green photoresist patterns of single colors further extend to regions over the black matrix between corresponding sub-pixel areas to form continuous strip-like color photoresist patterns, secondary spacers 62 for secondary support are disposed over regions of the red photoresist patterns and green photoresist patterns corresponding to the black matrix region.

As shown in FIGS. 3 and 4, the color filter substrate may further include a protective layer 5 disposed over the black matrix 3, the secondary spacers 62 and the color filter layer 4, and the main spacers 61 for primary support are disposed over the protective layer 5.

In this embodiment, the main spacers 61 and the secondary spacers 62 are in columnar shape or frustum cone shape. The main spacers and the secondary spacers may also be in other regular shapes, even in irregular shapes, which is not limited hereto. Generally, the height range of the main spacers is 2.8-3.2 μm, the height range of the secondary spacers is 2.2-2.8 μm, and the height difference between the main spacers 61 and the secondary spacers 62 is 0.4-1.0 μm.

Material for forming the secondary spacers 62 is the same as that for forming the color photoresist patterns after forming the continuous strip-like color photoresist patterns. For example, according to the manufacturing process for the color filter substrate in this embodiment, the secondary spacers 62 may be made of the same material as that for forming color photoresist patterns of the Nth color (color photoresist patterns of the last formed color), with respect to the upper surface of the black matrix 3 corresponded to where the continuous strip-like color photoresist patterns are formed, the height of the secondary spacers 62 is equal to or less than the sum of the thickness of the continuous strip-like color photoresist patterns where the spacers 62 are and the thickness of the color photoresist patterns of the $N^{th}$ color. In this embodiment, the secondary spacers 62 and the blue photoresist patterns are made of the same material, the height of the secondary spacers 62 with respect to the upper surface of the black matrix 3 is equal to or less than the sum of the thickness of the continuous strip-like red photoresist patterns or continuous strip-like green photoresist patterns and the thickness of the blue photoresist patterns.

Herein, in order to better emphasize the layer structures in the color filter substrate in the present invention and position relation among layers, layers in the schematic plan view (FIG. 3) are configured with a certain transparency.

Figure 6:
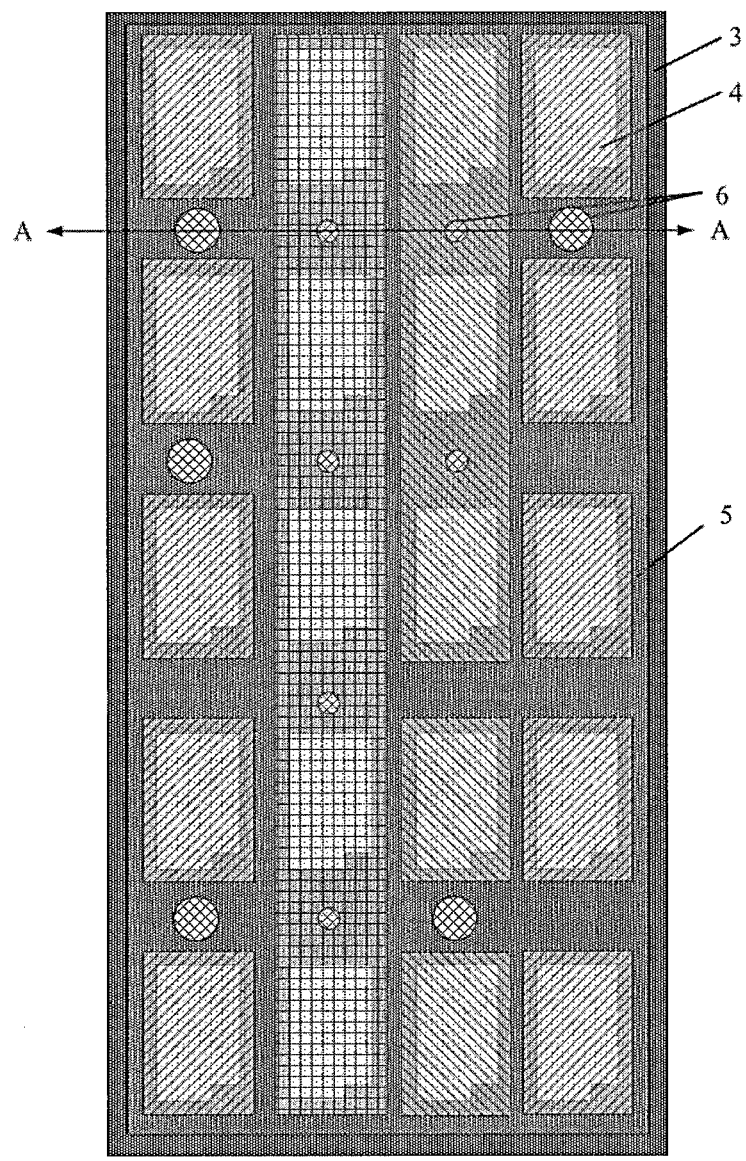
FIG. 6 is a schematic plan view of a color filter substrate variant in FIG. 3.

According to the configuration of the color filter substrate of the present embodiment, one pixel unit includes color photoresist patterns of N colors. Therefore, when manufacturing the color filter substrate, main spacers are disposed between at least one row/column of color photoresist patterns of a color in the color filter layer or over respective protective layer corresponding to the black matrix, and secondary spacers are disposed over other rows/columns of continuous strip-like color photoresist patterns of colors or respective protective layer corresponding to the black matrix, namely, the configuration of color filter substrate described previously. At the same time, it should be understood here, as a variant of the color filter substrate in the present embodiment, it is also possible to set only color photoresist patterns of M adjacent sub-pixel areas in at least one row/column as continuous strip-like shape according to product requirements, such as application environment of the display device and the design requirement of the spacer density, and secondary spacers 62 are formed over the continuous strip-like color photoresist patterns or their respective protective layer corresponding to the black matrix. At the same time, if the continuous strip-like color photoresist patterns are only parts of an entire row/column, main spacers 61 may be disposed between adjacent discontinuous color photoresist patterns of the row/column (which may be between color photoresist patterns corresponding to a single sub-pixel area, between continuous strip-like color photoresist patterns, between color photoresist pattern-continuous strip-like color photoresist pattern corresponding to a single sub-pixel area) or over their respective protective layer corresponding to the black matrix, as shown in FIG. 6.

Accordingly, a manufacturing method of color filter substrate is provided, including: forming a black matrix dividing the substrate into a plurality of sub-pixel areas arranged in matrix; forming a color filter layer over the substrate including cyclically disposing the color photoresist patterns with N (N≥3) different colors in discontinuous sub-pixel areas in adjacent N rows/columns, and forming continuous strip-like color photoresist patterns extending to regions over the black matrix; and forming spacers on the substrate. The spacers include main spacers formed between adjacent discontinuous color photoresist patterns corresponding to regions over the black matrix and secondary spacers formed over the continuous strip-like color photoresist patterns corresponding to the black matrix, wherein the secondary spacers are formed with the same photolithographic process as the color photoresist patterns of the Nth color.

As shown in FIGS. 3 and 4, the N=3, the color photoresist patterns of different colors include red photoresist patterns, green photoresist patterns and blue photoresist patterns cyclically arranged in rows/columns.

When forming the color filter layer 4, the manufacturing orders for color photoresist patterns of different colors are determined according to product design requirements. In this embodiment, the red photoresist patterns and green photoresist patterns are formed first, then the blue photoresist patterns are formed. Accordingly, the red photoresist patterns and the green photoresist patterns, which are two columns of color photoresist patterns of single colors, are configured as continuous strip-like shape, and the secondary spacers 62 are formed in the same photolithographic process as the blue photoresist patterns.

The step of forming the secondary spacers 62 in the same photolithographic process as the blue photoresist patterns includes:

Step S1: forming a layer of color resin material for forming color photoresist patterns of the $N^{th}$ color over the substrate with color photoresist patterns of N−1 colors already formed.

In this step, the step of forming color photoresist patterns of N−1 colors includes: forming color photoresist patterns of the first to the N−1$^{th}$ colors by N−1 photolithographic processes in the arrangement direction of the color photoresist patterns, wherein the color photoresist patterns in M neighbor sub-pixel areas of at least one row/column of a single color in the color filter layer further extend to regions over the black matrix between corresponding adjacent sub-pixel areas, so as to form continuous strip-like color photoresist patterns, wherein M≥2.

In this embodiment, red photoresist patterns and green photoresist patterns are formed by two photolithographic processes respectively, wherein the red photoresist patterns are of continuous strip-like shape, or the green photoresist patterns are of continuous strip-like shape, or the red photoresist patterns and green photoresist patterns are both of continuous strip-like shape, as illustrated in FIGS. 3 and 4. Secondary spacers 62 will be formed over the red photoresist patterns and/or the green photoresist patterns corresponding to the black matrix 3.

In this embodiment, the color resin material for forming blue photoresist patterns contains light sensitive composition and is formed over the substrate 1 to cover the formed continuous strip-like red photoresist patterns, continuous strip-like green photoresist patterns and the black matrix 3 by coating (for example, spin coating, blade coating, spin coating plus blade coating). The light sensitive composition contained in the color resin material may be negative or positive. The negative light sensitive composition is used as an example in the embodiments of the present invention, however, the present invention is not limited thereto.

Step S2: exposing the substrate having gone through step S1 with a mask provided with patterns corresponding to that for forming secondary spacers and color photoresist patterns of the $N^{th}$ color.

Figure 5:
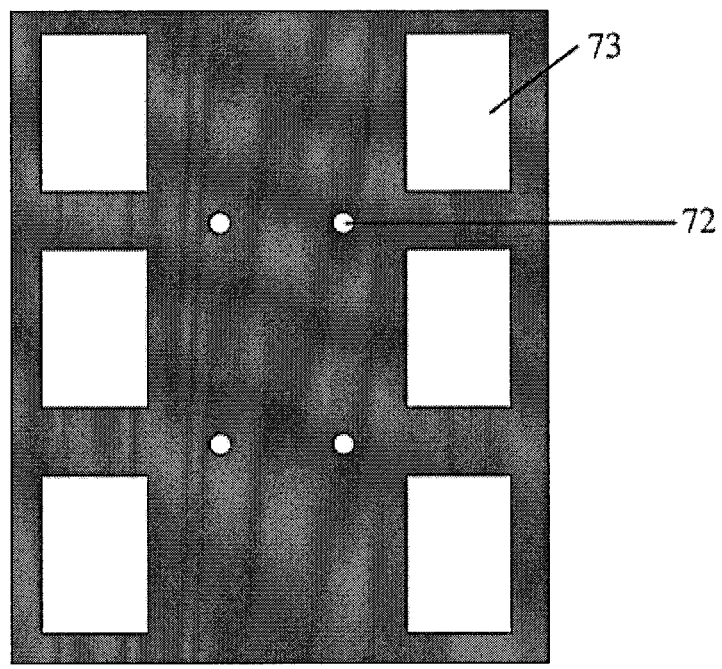
FIG. 5 is a schematic plan view of a mask for forming a color photoresist pattern of the Nth color and a secondary spacer in the color filter substrate in FIG. 3.

In this step, the mask is a common mask. As shown in FIG. 5, the secondary spacer regions 72 corresponding to the formation of the secondary spacers 62 and the color photoresist pattern regions 73 corresponding to the formation of the blue photoresist patterns in the common mask are set as regions in which the resin material is completely kept. For example, when the color resin material coated in step S1 for forming blue photoresist patterns contains negative light sensitive composition, the regions of the continuous strip-like red photoresist patterns and the continuous strip-like green photoresist patterns that correspond to the secondary spacer regions 72 are set as completely exposed regions so as to utilize the color resin material of forming the blue photoresist patterns to obtain secondary spacers 62. In this embodiment, the size of top cross sections of secondary spacers 62 may be controlled by adjusting the openings' size of the completely exposed regions on the mask for forming blue photoresist patterns corresponding to the formation of the secondary spacers.

If it is required to further adjust the heights of the secondary spacers 62, it is also possible to perform exposure by using a gray-tone mask or a halftone mask. That is, the secondary spacer regions 72 in the gray-tone mask or halftone mask corresponding to the formation of the secondary spacers 62 are set as half exposed regions (the color resin material contains positive light sensitive composition), while the color photoresist pattern regions 73 corresponding to the formation of the blue photoresist patterns are set as completely exposed regions, which will not be described in detail here.

Step S3: developing the substrate having gone through step S2, and forming the secondary spacers and color photoresist patterns of the $N^{th}$ color at the same time.

In step S2, the part of the color resin material for forming the blue photoresist patterns corresponding to the completely exposed regions undergo light sensitive reaction, and it will not be solved in the developing solution in the developing process of the step and thus is left, while the unexposed parts will be solved. That is, the secondary spacers 62 and the blue photoresist patterns are accordingly formed in this step. In this embodiment, the blue photoresist patterns are only provided in a plurality of discontinuous sub-pixel areas rather than extending to regions over the black matrix 3 of the corresponding row/column.

As can be seen from the above steps, when the fabrication of the color photoresist patterns of all colors is completed on the color filter substrate, the fabrication of the secondary spacers is also completed at the same time, while the main spacers will be separately formed in a subsequent process.

In addition, after the secondary spacers and the color photoresist patterns of the $N^{th}$ color are formed in the same photolithographic process, the method may further include a step of forming a protective layer 5. The protective layer 5 is disposed over the black matrix 3, the secondary spacers 62 and the color filter layer 4, while the main spacers 61 are disposed over the protective layer 5 to complete the fabrication of the color filter substrate.

In this embodiment, the fabrication step for forming the protective layer 5 is the same as in the conventional technology, which will not be described in detail here, while the main spacers 61 may be fabricated separately according to design requirements and therefore can be conveniently faulted by using a common mask. Further, the process conditions and the diameter dimension of the top cross section will not be limited by the secondary spacers, which will significantly simplify the mask design and reduce the difficulty of the spacer fabrication, as well as help to reduce the production cost.

In this embodiment, the height of the secondary spacers 62 is related to the thickness of the continuous strip-like color photoresist pattern where it is provided, and it can be adjusted properly in the subsequent manufacturing process of the protective layer 5 to obtain suitable height difference between the main spacers 61 and the secondary spacers 62. When the products are manufactured, it is possible to flexibly adjust the thickness, type of the protective layer 5 and/or adjust the height of secondary spacers 62 as required to allow the secondary spacers to satisfy the design requirements after the color filter substrate is finished.

In the display technical field, it is typically to determine the effect of spacers for supporting the liquid crystal cell by considering the height difference between the main spacers 61 and the secondary spacers 62. And the heights of the main spacers 61 and the secondary spacers 62 are measured generally with respect to the upper surface of certain regions of the color filter substrate. In this embodiment, it is measured with respect to the upper surface of the protective layer 5 corresponding to certain sub-pixel areas. In this embodiment, in the finished color filter substrate, the height of the secondary spacers 62 with respect to the upper surface of the black matrix 3 corresponding to the continuous strip-like color photoresist patterns is equal to or less than a sum of the thickness of the continuous strip-like color photoresist patterns where they are located and the thickness of the color photoresist patterns of the $N^{th}$ color. The height range of the main spacers 61 with respect to the upper surface of the protective layer 5 corresponding to the adjacent discontinuous color photoresist patterns is 2.8-3.2 μm, the height range of the secondary spacers 62 with respect to the upper surface of the protective layer 5 corresponding to the formation of the continuous strip-like color photoresist patterns is 2.2-2.8 μm, therefore, the ideal maximum height difference may be as large as 1.0 μm.

According to an embodiment of the present invention, a display device is also provided, including the described color filter substrate. The display device may be any product or component with display function, such as a liquid crystal panel, a cellphone, a flat computer, a TV set, a display, a notebook computer, a digital picture frame or a navigator.

Embodiment 2

The difference between the present embodiment and Embodiment 1 lies in that the color photoresist patterns contained in the color filter layer in the color filter substrate of the present embodiment have different colors.

In this embodiment, the N=4, the color photoresist patterns of different colors include red photoresist patterns, green photoresist patterns, blue photoresist patterns and yellow photoresist patterns cyclically arranged in rows/columns.

Figure 7:
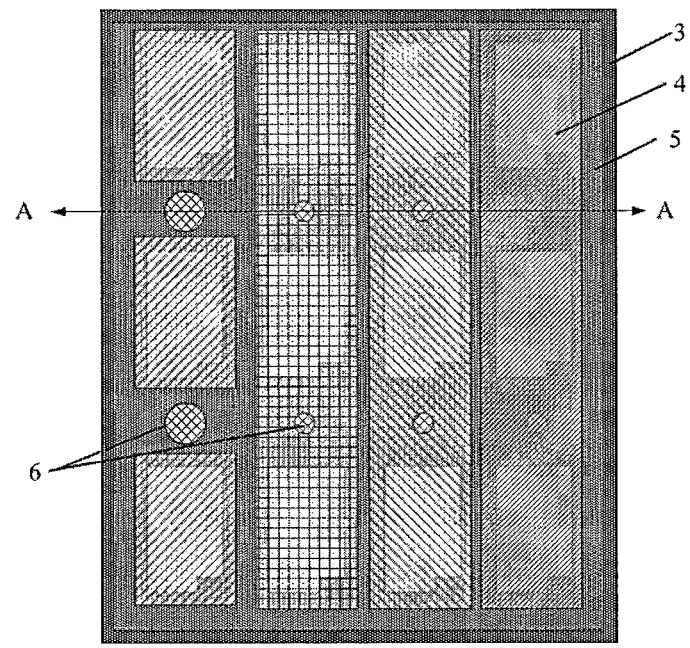
FIG. 7 is a schematic plan view of the color filter substrate in Embodiment 2 of the present invention.
Figure 8:
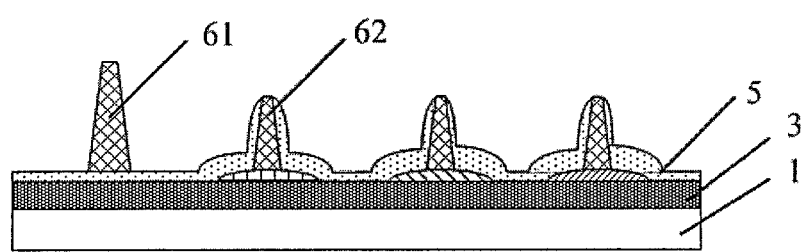
FIG. 8 is a sectional view along line A-A of the color filter substrate in FIG. 7.

As shown in FIGS. 7 and 8, in this embodiment, the green photoresist patterns, the blue photoresist patterns and the yellow photoresist patterns, which are three columns of color photoresist patterns of single colors, are provided as continuous strip-like shape, the secondary spacers 62 for secondary support are disposed over the green photoresist patterns, the blue photoresist patterns and the yellow photoresist patterns corresponding to regions of the black matrix, the main spacers 61 are disposed over the protective layer 5 of the row/column of the red photoresist patterns corresponding to regions of the black matrix.

Accordingly, in the manufacturing method of the color filter substrate in the present embodiment, the secondary spacers 62 and the red photoresist patterns are formed in the same photolithographic process. For example, the manufacturing method of the color filter substrate includes the following steps:

Step S0: forming green photoresist patterns, blue photoresist patterns and yellow photoresist patterns by three photolithographic processes.

In this embodiment, the green photoresist patterns are of continuous strip-like shape, or the blue photoresist patterns are of continuous strip-like shape, or the yellow photoresist patterns are of continuous strip-like shape, or the green photoresist patterns and the blue photoresist patterns are both of continuous strip-like shape, or the green photoresist patterns and the yellow photoresist patterns are both of continuous strip-like shape, or the blue photoresist patterns and the yellow photoresist patterns are both of continuous strip-like shape, or the green photoresist patterns, the blue photoresist patterns and the yellow photoresist patterns are all of continuous strip-like shape (as described in examples shown in FIGS. 7, 8), the secondary spacers 62 will be formed over the continuous strip-like color photoresist patterns corresponding to the regions of the black matrix 3.

Step S1: forming a layer of color resin material for forming red photoresist patterns on the substrate 1 having undergone step S0.

Step S2: exposing the substrate having gone through step S1 by using a mask provided with patterns corresponding to that for forming secondary spacers and red photoresist patterns.

Figure 9:
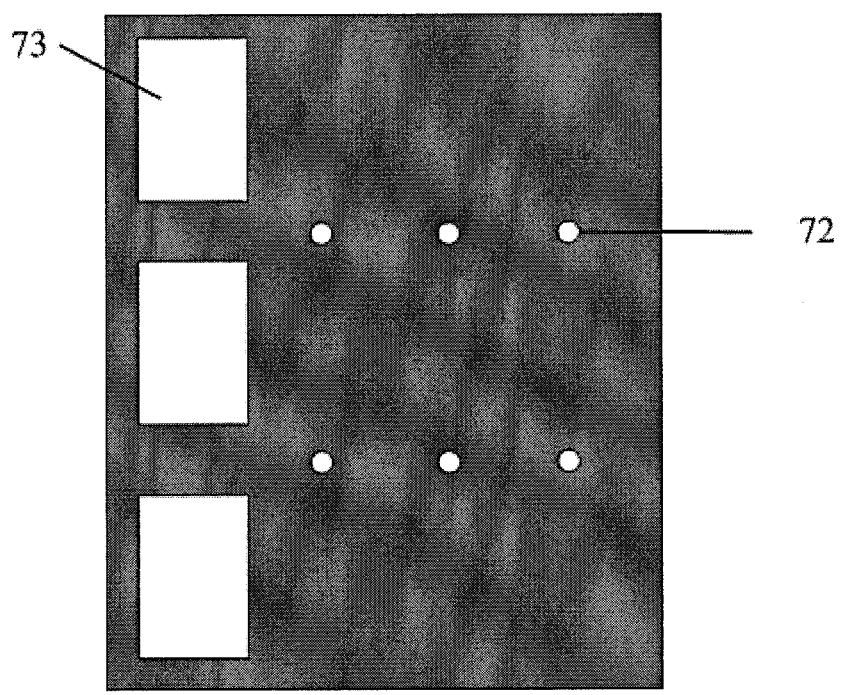
FIG. 9 is a schematic plan view of a mask for forming a color photoresist pattern of the Nth color and a secondary spacer in the color filter substrate in FIG. 7.

In this step, the pattern of the mask is shown in FIG. 9, which includes the secondary spacer regions 72 for forming the secondary spacers 62 and the color photoresist pattern regions 73 for forming the red photoresist patterns.

Step S3: developing the substrate having gone through step S2, and forming the secondary spacers and red photoresist patterns at the same time.

Step S4: manufacturing a protective layer 5 on the substrate 1 having gone through step S3.

Step S5: manufacturing main spacers 61 on the substrate 1 having gone through step S4.

Other structures of the color filter substrate in the present embodiment is the same as in the Embodiment 1, and the specific processes in the manufacturing method are similar to those in Embodiment 1, which will not be described in detail here.

In addition to the red photoresist patterns, the green photoresist patterns and the blue photoresist patterns described in Embodiment 1, and the red photoresist patterns, the green photoresist patterns, the blue photoresist patterns and the yellow photoresist patterns described in Embodiment 2, the color filter layer may also be other designs. For example, in addition to the red photoresist patterns, the green photoresist patterns and the blue photoresist patterns, the color filter layer may further include color photoresist patterns of other colors such as transparent color and wine red color, which may be adjusted according to design requirements and is not limited here.

Furthermore, there is no special requirement to the manufacturing order of the color photoresist patterns of different colors in the color filter layer, which may be adjusted according to production and design requirements. The manufacturing orders of the color photoresist patterns of different colors in Embodiment 1 and Embodiment 2 are only illustrative examples rather than limiting the order.

In Embodiments 1 and 2 of the present invention, by changing the design of color photoresist patterns of the color filter layer of the color filter substrate in the display device and providing corresponding manufacturing method of the color filter substrate, the fabrication of the secondary spacers is completed when the fabrication of the color filter layer of the color filter substrate is completed, and the main spacers can be formed separately in a subsequent process. That is, the main spacers and the secondary spacers are manufactured separately, which can avoid using the halftone mask or graytone mask in forming the secondary spacers and the main spacers simultaneously in conventional technology. It needs only a common mask, which significantly reduces the production costs. Furthermore, by setting the color photoresist patterns provided with secondary spacers as continuous strip-like shape and forming the secondary spacers by using the color resin material for the finally formed color photoresist patterns, it is possible to adjust the size of the secondary spacers by controlling the openings' size of the exposure zones on a common mask corresponding to formation of secondary spacers, and at the same time it is also possible to assist adjusting the size of the secondary spacers by forming a protective layer, addressing the problem of difficulty of realizing height difference between the main spacers and the secondary spacers due to the limitation by the top size of spacers.

The color filter substrate and the manufacturing method of color filter substrate in embodiments of the present invention can be applicable to various modes of display devices, such as TN (Twisted Nematic) mode, VA (Vertical Alignment) mode, ADS (ADvanced Super Dimension Switch) mode, and the like. Among them, it is to be noted that the color filter substrate and the manufacturing method of the color filter substrate in embodiments of the present invention are particularly suitable for use in ADS mode display devices.

In an ADS mode, a multi-dimensional electric field is formed by an electric field generated at edges of slit electrodes on the same plane and an electric field generated between a slit electrode layer and a plate electrode layer, so that liquid crystal molecules at all orientations located between the slit electrodes and directly above the electrodes in a liquid crystal cell, can be rotated, thereby enhancing the work efficiency of the liquid crystals and increasing light transmission efficiency. The Advanced-Super Dimensional Switching technology can improve the image quality of LCD products and has advantages of high resolution, high transmissivity, low power consumption, wide viewing angles, high aperture ratio, low chromatic aberration, and no push Mura, etc.

In the color filter substrate in embodiments of the present invention, by changing the design of the color photoresist patterns of the color filter layer and providing corresponding manufacturing method of the color filter substrate, the main spacers and the secondary spacers can be implemented in different process steps, which avoids the use of the halftone mask or gray-tone mask in forming the secondary spacers and main spacers simultaneously in conventional technology and the problem of difficulty of realizing height difference design of the main spacers and the secondary spacers due to the limitations of top sizes of the spacers while ensuring the height difference between main spacers and secondary spacers, hence significantly reducing the production costs.

It is understood that the above implementations are only illustrative embodiments used for explaining the principle of the present invention, but the present invention is not limited thereto. For an ordinary person in the art, various modifications and improvements may be made without departing from the spirit and scope of the present invention, which should all fall within the protection scope of the present invention.

What is claimed is:

1. A color filter substrate, comprising:
a substrate;
a black matrix dividing the substrate into a plurality of sub-pixel areas arranged in matrix;
a color filter layer including color photoresist patterns with N different colors, N≥3, arranged cyclically in discontinuous sub-pixel areas in adjacent N rows/columns, the color photoresist patterns in M adjacent sub-pixel areas of a single color in at least one line/column in the color filter layer extending to regions over the black matrix corresponding to regions between adjacent sub-pixel areas, to form continuous strip-like color photoresist patterns, wherein M≥2; and
spacers including main spacers disposed over regions between adjacent discontinuous color photoresist patterns corresponding to the black matrix and secondary spacers disposed over regions of the continuous strip-like color photoresist patterns corresponding to the black matrix.

2. The color filter substrate according to claim 1, wherein the N=3, the color photoresist patterns of different colors comprise red photoresist patterns, green photoresist patterns and blue photoresist patterns cyclically arranged in rows/columns; or
the N=4, the color photoresist patterns of different colors include red photoresist patterns, green photoresist patterns, blue photoresist patterns and yellow photoresist patterns cyclically arranged in rows/columns.

3. The color filter substrate according to claim 2, wherein the secondary spacers are formed by a material which is identical to that is used for forming the color photoresist patterns while or after forming the continuous strip-like color photoresist patterns.

4. The color filter substrate according to claim 2, wherein the color filter substrate further comprises a protective layer disposed over the black matrix, the secondary spacers and the color filter layer, and the main spacers are disposed over the protective layer.

5. The color filter substrate according to claim 1, wherein the secondary spacers are formed by a material which is identical to that is used for forming color photoresist patterns while or after forming the continuous strip-like color photoresist patterns.

6. The color filter substrate according to claim 1, wherein the color filter substrate further comprises a protective layer disposed over the black matrix, the secondary spacers and the color filter layer, and the main spacers are disposed over the protective layer.

7. A display device comprising the color filter substrate according to claim 1.

8. A method of manufacturing a color filter substrate, comprising:
forming a black matrix over a substrate, which divides the substrate into a plurality of sub-pixel areas arranged in matrix;
forming a color filter layer over the substrate, including cyclically disposing color photoresist patterns of N different colors in discontinuous sub-pixel areas in adjacent N rows/columns, N≥3, and forming continuous strip-like color photoresist patterns extending to regions over the black matrix; and
forming spacers including main spacers and secondary spacers over the substrate, the main spacers formed over regions between adjacent discontinuous color photoresist patterns corresponding to the black matrix, and the secondary spacers formed over regions of the continuous strip-like color photoresist patterns corresponding to the black matrix, the secondary spacers being formed in a same photolithographic process with the color photoresist patterns of a $N^{th}$ color.

9. The method according to claim 8, wherein step of forming the secondary spacers in a same photolithographic process with the color photoresist patterns of a $N^{th}$ color comprises:
Step S1: forming a layer of color resin material for forming color photoresist patterns of the $N^{th}$ color over the substrate with color photoresist patterns of N−1 colors already formed;

Step S2: exposing the substrate having gone through step S1 with a mask provided with patterns corresponding to that for forming secondary spacers and color photoresist patterns of the $N^{th}$ color; and Step S3: developing the substrate having gone through step S2, and forming the secondary spacers and the color photoresist patterns of the $N^{th}$ color at the same time.

10. The method according to claim 9, wherein in the step S1, step of forming color photoresist patterns of N−1 colors comprises: forming color photoresist patterns of a first to a $N-1^{th}$ colors by N−1 photolithographic processes respectively in the arrangement direction of the color photoresist patterns, the color photoresist patterns in M neighbor sub-pixel areas of at least one row/column of a single color in the color filter layer extending to regions over the black matrix between corresponding adjacent sub-pixel areas, to form continuous strip-like color photoresist patterns, wherein M≥2.

11. The method according to claim 10, wherein the color photoresist patterns of the $N^{th}$ color is made of a color resin material containing a light sensitive composition, and in step S2, regions in the mask corresponding to formation of secondary spacers are designed as regions keeping resin material.

12. The method according to claim 11, further comprising a step of forming a protective layer formed over the black matrix, the secondary spacers and the color filter layer, wherein the main spacers are formed over the protective layer.

13. The method according to claim 9, wherein the color photoresist patterns of the $N^{th}$ color is made of a color resin material containing a light sensitive composition, and in step S2, regions in the mask corresponding to the formation of the secondary spacers are designed as regions keeping resin material.

14. The method according to claim 13, further comprising a step of forming a protective layer formed over the black matrix, the secondary spacers and the color filter layer, wherein the main spacers are formed over the protective layer.

15. The method according to claim 13, wherein the N=3, the color photoresist patterns of different colors comprise red photoresist patterns, green photoresist patterns and blue photoresist patterns cyclically arranged in rows/columns; or the N=4, the color photoresist patterns of different colors comprise red photoresist patterns, green photoresist patterns, blue photoresist patterns and yellow photoresist patterns cyclically arranged in rows/columns.

16. The method according to claim 9, further comprising a step of forming a protective layer formed over the black matrix, the secondary spacers and the color filter layer, wherein the main spacers are formed over the protective layer.

17. The method according to claim 10, further comprising a step of forming a protective layer formed over the black matrix, the secondary spacers and the color filter layer, wherein the main spacers are formed over the protective layer.

18. The method according to claim 10, wherein the N=3, the color photoresist patterns of different colors comprise red photoresist patterns, green photoresist patterns and blue photoresist patterns cyclically arranged in rows/columns; or the N=4, the color photoresist patterns of different colors comprise red photoresist patterns, green photoresist patterns, blue photoresist patterns and yellow photoresist patterns cyclically arranged in rows/columns.

19. The method according to claim 8, further comprising a step of forming a protective layer formed over the black matrix, the secondary spacers and the color filter layer, wherein the main spacers are formed over the protective layer.

20. The method according to claim 8, wherein the N=3, the color photoresist patterns of different colors comprise red photoresist patterns, green photoresist patterns and blue photoresist patterns cyclically arranged in rows/columns; or the N=4, the color photoresist patterns of different colors comprise red photoresist patterns, green photoresist patterns, blue photoresist patterns and yellow photoresist patterns cyclically arranged in rows/columns.

* * * * *